3,668,007
SYRUP FRACTIONATION PROCESS

Carl Thomas Egger, Gerald Bernard Pfundstein, and Donald Lee Gillenwater, Muscatine, Iowa, assignors to Grain Processing Corporation, Muscatine, Iowa
No Drawing. Filed Oct. 8, 1970, Ser. No. 79,302
Int. Cl. B01d *13/00;* C13k *1/06, 1/08*
U.S. Cl. 127—38                                                                        5 Claims

ABSTRACT OF THE DISCLOSURE

Starch is subjected to hydrolysis with an acid to convert the starch to hydrolyzate product which is then fractionated under applied pressure by means of membrane separation to recover a lower conversion product and a higher conversion product.

---

This invention relates to fractionation of syrup into different sugar syrups.

It is, of course, known that starch can be hydrolyzed with acids and enzymes to produce sugar syrups. Various sources of starch, such as wheat, potatoes, rice, tapioca, etc., are frequently employed for this purpose but because of its abundance and low cost, unmodified corn starch is very widely used. By the use of acids such as hydrochloric or sulfuric, starch can be hydrolyzed to produce syrups containing reducing sugars including dextrose. While acid hydrolysis is one of the most economical methods for treating starch to produce dextrose, it has definite practical limitations. Thus, if acid hydrolysis is carried out to great extent in an attempt to achieve high dextrose equivalent (D.E.) hydrolyzates, i.e., products having D.E. values considerably above about 55, considerable bitterness develops in the products.

Enzymes can also be employed to convert starch to syrup or dextrose and various techniques are known in the art for hydrolyzing starch by means of enzymes, either alone or combined with acid hydrolysis. In such combination processes hydrolysis is generally first conducted by means of an acid to achieve partial conversion of the starch and then further hydrolysis is effected by use of an enzyme. The enzyme, amyloglucosidase, which occurs in culture filtrates of microorganisms, particularly certain strains of *Aspergillus niger,* is frequently employed. While relatively high conversion (high D.E.) of starch can be achieved with enzymes, their use has certain disadvantages particularly with respect to costs.

Generally, in commercial practice "regular" corn syrups are marketed at a dextrose equivalent (D.E.) value of about 43±1.5 and are obtained by acid hydrolysis. Likewise, "high" corn syrups are marketed at a dextrose equivalent (D.E.) value of about 63.5±1.5 and are generally obtained by a combination of acid and enzyme hydrolysis. It is a particular object of the present invention to provide a process whereby "regular" corn syrups and "high" corn syrups are obtained simultaneously without the use of enzymes.

It is another object of the present invention to provide a process wherein starch hydrolyzates of relatively low degree of conversion and starch hydrolyzates of relatively high degree of conversion are obtained by acid hydrolysis alone without the products exhibiting undesirable bitterness or undesirable color.

In accordance with this invention starch is subjected to hydrolysis with an acid such as hydrochloric or sulfuric. The said syrup is then fractionated to obtain a low conversion portion and a high conversion portion. The fractionation is achieved by means of membrane separation. The known principle of this procedure is to apply pressure to transfer liquid or liquid containing relatively small molecules of solute through a semi-permeable membrane while retaining the relatively larger molecules. Various types of membranes are available which will permit certain solute materials to pass through the membrane into the diffusate while other solute materials are retained thereon as retentate. For use in this invention a membrane is chosen which is capable of permitting a high conversion material (high D.E. material) to pass through the membrane into the diffusate while low conversion materials (low D.E. materials) are retained. The diffusate and retentate are then separately concentrated to yield, respectively, high and low D.E. syrups or the diffusate and retentate can be further processed to yield, respectively, high and low D.E. syrup solids.

In carrying out the process of this invention corn starch, for example, is subjected to acid hydrolysis according to conventional techniques. Thus, for example, corn starch is slurried in water, the solids concentration ranging from about 15 to 22° Baumé, preferably 20 to 22° Baumé and an an acid such as sulfuric or hydrochloric acid is added. Hydrolysis is effected at a temperature of 240 to 330° F., preferably 300 to 310° F., for a period sufficient to produce a medium conversion hydrolyzate or syrup. For the purposes of this invention a medium conversion syrup is one having a dextrose equivalent value of from about 45 to 60 D.E. When the desired conversion of starch is achieved the hydrolytic action is terminated by neutralization.

After acid hydrolysis, the medium conversion syrup is subjected to membrane separation. If desired, the syrup prior to the membrane separation operation can be clarified by filtration or centrifugation to remove insolubles so as to prevent membrane fouling. Conventional membrane separation equipment which is designed for either low or high pressure operation can be employed and a semi-permeable membrane is employed which permits the high conversion (high D.E.) material in the syrup to pass into the diffusate while retaining the low conversion (low D.E.) material in the syrup. Accordingly, the choice of membrane is routine based on these considerations. A suitable representative membrane is "Permasep 3598–136–1" available from the du Pont Chemical Company.

After membrane separation the diffusate and the retentate can be concentrated (evaporated) by conventional procedures to obtain a high conversion syrup and a low conversion syrup, respectively, having desired viscosities. Alternatively, the diffusate and retentate can be processed to obtain syrup solids.

To further illustrate the advantages of the invention a 30% solids corn syrup which was hydrolyzed with acid to a D.E. of 56 was subjected to membrane separation. The membrane employed was "Permasep 3598–136–1" available from the du Pont Chemical Company and a pressure of 500 p.s.i. was applied to the corn syrup. The retentate represented 45.6% of the initial syrup solids and assayed 43.1 D.E. Thi syrup meets the usual specifications (43.5±1.5) of a commercial "regular" corn syrup. The diffusate representing 54.4% of the initial syrup solids assayed 67.5 D.E. Minimum blending of the diffusate with a lower D.E. syrup produced a corn syrup meeting the usual specifications (63.5±1.5) of a "high" commercial corn syrup.

The above procedure was repeated utilizing a 10% solids 56 D.E. acid hydrolyzed syrup. The diffusate in this case assayed at 63.9 D.E. while the retentate assayed at 40.3 D.E. which, with a minimum of blending, meets the usual specifications for a regular corn syrup.

The viscosities at 75° F. of the above blended membrane treated corn syrups were compared with other corn syrups. A Brookfield Model LVF viscometer fitted with a Number 1 spindle and operated at 60 revolutions per minute was used. The solids concentration of each syrup was 58.0%. The results are shown in Table I.

TABLE I

| Sample | D.E. | Viscosity, cp. |
|---|---|---|
| #1 commercial corn syrup (acid hydrolysis) | 43.2 | 74.0 |
| #2 commercial corn syrup | 44.1 | 73.3 |
| #3 commercial corn syrup | 42.2 | 85.0 |
| #4 commercial corn syrup | 43.6 | 76.5 |
| Membrane retentate (from 30% solids CSU) | 43.1 | 77.0 |
| Membrane retentate (from 10% solids CSU) | 41.2 | 80.5 |
| #1 commercial corn syrup (acid/enzyme hydrolysis) | 63.2 | 45.0 |
| #2 commercial corn syrup | 60.9 | 42.8 |
| #3 commercial corn syrup | 58.4 | 48.5 |
| #4 commercial corn syrup | 59.5 | 49.7 |
| Membrane diffusate (from 30% solids CSU) | 63.7 | 44.5 |
| Membrane diffusate (from 10% solids CSU) | 62.7 | 47.0 |

It will be appreciated that by the present invention starch hydrolyzates can be obtained by acid hydrolysis alone without incurring undesired bitterness or color in the hydrolyzate products. Starch derived from various sources can be treated in accordance with this invention and by appropriate adjustment in the dextrose equivalent value of the acid hydrolyzates subjected to fractionation and/or the ratio of diffusate to retentate, products having desired dextrose equivalent values can be obtained. Thus, for example, by subjecting a 57 D.E. starch hydrolyzate to fractionation so as to achieve a 75/25 ratio of solids in the diffusate and retentate, products having D.E. values of approximately 62 and 42 can be respectively obtained. The simultaneous production of regular and high D.E. corn syrups from a single hydrolysis unit is achieved by this invention. Time losses in switching from different D.E. syrups are eliminated and the use of enzymes is not required. Furthermore, it was found unexpectedly that high solids concentrations could be treated and that the syrups produced by this process did not differ in viscosity from those produced by conventional procedures.

Those modifications and equivalents which fall within the spirit of the invention are to be considered a part thereof.

What is claimed is:

1. A process for treating starch which comprises subjecting starch to hydrolysis with an acid to produce a starch hydrolyzate and subjecting the said hydrolyzate to fractionation under substantial applied pressure on a semi-permeable membrane to separate two fractions having different dextrose equivalent values.

2. A process in accordance with claim 1 wherein the dextrose equivalent value of said hydrolyzate subjected to fractionation ranges from about 45 to 60.

3. A process in accordance with claim 1 wherein the dextrose equivalent value of said hydrolyzate subjected to fractionation ranges from about 54 to 56.

4. A process in accordance with claim 1 wherein the two fractions of the starch hydrolyzate resulting from said fractionation are recovered and concentrated to give sugar syrups.

5. A process in accordance with claim 1 wherein the two fractions of the starch hydrolyzate resulting from said fractionation are recovered and further processed to give solid sugar products.

References Cited
UNITED STATES PATENTS

| 2,410,264 | 10/1946 | Brock | 127—40 |
| 3,228,876 | 1/1966 | Mahon | 127—54 X |
| 3,342,729 | 9/1967 | Strand | 127—54 X |

JOSEPH SCOVRONEK, Primary Examiner

S. MARANTZ, Assistant Examiner

U.S. Cl. X.R.
99—142; 127—54